US008553012B2

(12) United States Patent
Baucom et al.

(10) Patent No.: US 8,553,012 B2
(45) Date of Patent: Oct. 8, 2013

(54) APPARATUS FOR DISPLAYING DRAWINGS

(75) Inventors: Allan Scott Baucom, Littleton, MA (US); Ara N. Knaian, Newtown, MA (US); Heather A. Linden, Boynton Beach, FL (US); Timothy J. O'Malley, Wakefield, MA (US); Russell J. Wilcox, Natick, MA (US)

(73) Assignee: E Ink Corporation, Cambridge, MA (US)

( * ) Notice: Subject to any disclaimer, the term of this patent is extended or adjusted under 35 U.S.C. 154(b) by 499 days.

(21) Appl. No.: 12/766,943

(22) Filed: Apr. 26, 2010

(65) Prior Publication Data

US 2010/0201651 A1 Aug. 12, 2010

Related U.S. Application Data

(62) Division of application No. 11/306,315, filed on Dec. 22, 2005, now Pat. No. 7,705,824, which is a division of application No. 10/063,023, filed on Mar. 13, 2002, now Pat. No. 7,030,854.

(60) Provisional application No. 60/275,291, filed on Mar. 13, 2001.

(51) Int. Cl.
*G06F 3/045* (2006.01)

(52) U.S. Cl.
USPC .......................................... 345/174; 345/107

(58) Field of Classification Search
USPC .................... 345/87–93, 103–107, 173–178; 178/18.01–18.09, 19.01–19.06
See application file for complete search history.

(56) References Cited

U.S. PATENT DOCUMENTS 3,668,106 A 6/1972 Ota
3,756,693 A 9/1973 Ota
3,767,392 A 10/1973 Ota
3,792,308 A 2/1974 Ota (Continued)

FOREIGN PATENT DOCUMENTS

EP 018715 A1 10/1994
EP 1099207 B1 3/2002

(Continued)

OTHER PUBLICATIONS

Akins, R., "Displays for Hand-Held Portable Electronic Products", SID 00 Digest, 510 (2000).

(Continued)

*Primary Examiner* — Vijay Shankar
(74) *Attorney, Agent, or Firm* — David J. Cole

(57) ABSTRACT

A first apparatus for displaying drawings comprises a housing having an aperture, a drawing sheet comprising electro-optic material movable through the aperture between closed and open positions, and a writing device for writing on the sheet as it moved between its closed and open positions. A second apparatus comprises a display member having a viewing surface, support means for supporting this display member above a floor, an electro-optic medium disposed on the display member, and a movable writing head for writing on the electro-optic medium. Another display comprises an optic medium with two display states visible through a viewing surface. A touch screen is disposed on the opposed side of the optic medium from the viewing surface, and the optic medium is deformable such that pressure applied to the viewing surface will be transmitted to the touch screen.

23 Claims, 5 Drawing Sheets

(56) References Cited

U.S. PATENT DOCUMENTS

| | | | |
|---|---|---|---|
| 3,870,517 | A | 3/1975 | Ota et al. |
| 3,892,568 | A | 7/1975 | Ota |
| 4,418,346 | A | 11/1983 | Batchelder |
| 4,730,186 | A | 3/1988 | Koga et al. |
| 4,828,617 | A | 5/1989 | Csillag et al. |
| 4,888,309 | A | 12/1989 | Araya |
| 5,109,354 | A | 4/1992 | Yamashita et al. |
| 5,148,002 | A | 9/1992 | Kuo et al. |
| 5,316,341 | A | 5/1994 | Schwartz |
| 5,389,945 | A | 2/1995 | Sheridon |
| 5,494,445 | A | 2/1996 | Sekiguchi et al. |
| 5,508,720 | A | 4/1996 | DiSanto et al. |
| 5,517,407 | A | 5/1996 | Weiner |
| 5,538,430 | A | 7/1996 | Smith et al. |
| 5,575,554 | A | 11/1996 | Guritz |
| D383,750 | S | 9/1997 | DiSanto et al. |
| 5,679,821 | A | 10/1997 | Takei et al. |
| 5,695,346 | A | 12/1997 | Sekiguchi et al. |
| 5,745,094 | A | 4/1998 | Gordon, II et al. |
| 5,760,761 | A | 6/1998 | Sheridon |
| 5,761,485 | A | 6/1998 | Munyan |
| 5,777,782 | A | 7/1998 | Sheridon |
| 5,808,783 | A | 9/1998 | Crowley |
| 5,835,577 | A | 11/1998 | Disanto et al. |
| 5,872,552 | A | 2/1999 | Gordon, II et al. |
| 5,912,283 | A | 6/1999 | Hashizume et al. |
| 5,930,026 | A | 7/1999 | Jacobson et al. |
| 5,961,804 | A | 10/1999 | Jacobson et al. |
| 6,005,482 | A | 12/1999 | Moran et al. |
| 6,017,584 | A | 1/2000 | Albert et al. |
| 6,054,071 | A | 4/2000 | Mikkelsen, Jr. |
| 6,055,091 | A | 4/2000 | Sheridon et al. |
| 6,067,185 | A | 5/2000 | Albert et al. |
| 6,097,531 | A | 8/2000 | Sheridon |
| 6,105,290 | A | 8/2000 | Coates et al. |
| 6,118,426 | A | 9/2000 | Albert et al. |
| 6,120,588 | A | 9/2000 | Jacobson |
| 6,120,839 | A | 9/2000 | Comiskey et al. |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,166,711 | A | 12/2000 | Odake |
| 6,172,798 | B1 | 1/2001 | Albert et al. |
| 6,177,921 | B1 | 1/2001 | Comiskey et al. |
| 6,184,856 | B1 | 2/2001 | Gordon, II et al. |
| 6,225,971 | B1 | 5/2001 | Gordon, II et al. |
| 6,232,950 | B1 | 5/2001 | Albert et al. |
| 6,241,921 | B1 | 6/2001 | Jacobson et al. |
| 6,249,271 | B1 | 6/2001 | Albert et al. |
| 6,252,564 | B1 | 6/2001 | Albert et al. |
| 6,262,706 | B1 | 7/2001 | Albert et al. |
| 6,262,833 | B1 | 7/2001 | Loxley et al. |
| 6,271,823 | B1 | 8/2001 | Gordon, II et al. |
| 6,300,932 | B1 | 10/2001 | Albert |
| 6,301,038 | B1 | 10/2001 | Fitzmaurice et al. |
| 6,307,919 | B1 | 10/2001 | Yoked |
| 6,312,304 | B1 | 11/2001 | Duthaler et al. |
| 6,312,971 | B1 | 11/2001 | Amundson et al. |
| 6,323,989 | B1 | 11/2001 | Jacobson et al. |
| 6,327,072 | B1 | 12/2001 | Comiskey et al. |
| 6,376,828 | B1 | 4/2002 | Comiskey |
| 6,377,387 | B1 | 4/2002 | Duthaler et al. |
| 6,392,785 | B1 | 5/2002 | Albert et al. |
| 6,392,786 | B1 | 5/2002 | Albert |
| 6,400,571 | B1 | 6/2002 | Kimura et al. |
| 6,413,790 | B1 | 7/2002 | Duthaler et al. |
| 6,422,687 | B1 | 7/2002 | Jacobson |
| 6,445,374 | B2 | 9/2002 | Albert et al. |
| 6,445,489 | B1 | 9/2002 | Jacobson et al. |
| 6,459,418 | B1 | 10/2002 | Comiskey et al. |
| 6,473,072 | B1 | 10/2002 | Comiskey et al. |
| 6,480,182 | B2 | 11/2002 | Turner et al. |
| 6,498,114 | B1 | 12/2002 | Amundson et al. |
| 6,504,524 | B1 | 1/2003 | Gates et al. |
| 6,506,438 | B2 | 1/2003 | Duthaler et al. |
| 6,512,354 | B2 | 1/2003 | Jacobson et al. |
| 6,515,649 | B1 | 2/2003 | Albert et al. |
| 6,518,949 | B2 | 2/2003 | Drzaic |
| 6,521,489 | B2 | 2/2003 | Duthaler et al. |
| 6,531,997 | B1 | 3/2003 | Gates et al. |
| 6,535,197 | B1 | 3/2003 | Comiskey et al. |
| 6,538,801 | B2 | 3/2003 | Jacobson et al. |
| 6,545,291 | B1 | 4/2003 | Amundson et al. |
| 6,550,673 | B2 | 4/2003 | Massaro |
| 6,580,545 | B2 | 6/2003 | Morrison et al. |
| 6,628,258 | B1 | 9/2003 | Nakamura |
| 6,639,578 | B1 | 10/2003 | Comiskey et al. |
| 6,652,075 | B2 | 11/2003 | Jacobson |
| 6,657,772 | B2 | 12/2003 | Loxley |
| 6,664,944 | B1 | 12/2003 | Albert et al. |
| D485,294 | S | 1/2004 | Albert |
| 6,672,921 | B1 | 1/2004 | Liang et al. |
| 6,680,725 | B1 | 1/2004 | Jacobson |
| 6,683,333 | B2 | 1/2004 | Kazlas et al. |
| 6,693,620 | B1 | 2/2004 | Herb et al. |
| 6,704,133 | B2 | 3/2004 | Gates et al. |
| 6,710,540 | B1 | 3/2004 | Albert et al. |
| 6,717,522 | B1 | 4/2004 | Nagatomo |
| 6,721,083 | B2 | 4/2004 | Jacobson et al. |
| 6,724,519 | B1 | 4/2004 | Comiskey et al. |
| 6,727,881 | B1 | 4/2004 | Albert et al. |
| 6,738,050 | B2 | 5/2004 | Comiskey et al. |
| 6,750,473 | B2 | 6/2004 | Amundson et al. |
| 6,753,830 | B2 | 6/2004 | Gelbman |
| 6,753,999 | B2 | 6/2004 | Zehner et al. |
| 6,788,449 | B2 | 9/2004 | Liang et al. |
| 6,816,147 | B2 | 11/2004 | Albert |
| 6,819,471 | B2 | 11/2004 | Amundson et al. |
| 6,822,782 | B2 | 11/2004 | Honeyman et al. |
| 6,825,068 | B2 | 11/2004 | Denis et al. |
| 6,825,829 | B1 | 11/2004 | Albert et al. |
| 6,825,970 | B2 | 11/2004 | Goenaga et al. |
| 6,831,769 | B2 | 12/2004 | Holman et al. |
| 6,839,158 | B2 | 1/2005 | Albert et al. |
| 6,842,167 | B2 | 1/2005 | Albert et al. |
| 6,842,279 | B2 | 1/2005 | Amundson |
| 6,842,657 | B1 | 1/2005 | Drzaic et al. |
| 6,864,875 | B2 | 3/2005 | Drzaic et al. |
| 6,865,010 | B2 | 3/2005 | Duthaler et al. |
| 6,866,760 | B2 | 3/2005 | Paolini Jr. et al. |
| 6,870,657 | B1 | 3/2005 | Fitzmaurice et al. |
| 6,870,661 | B2 | 3/2005 | Pullen et al. |
| 6,900,851 | B2 | 5/2005 | Morrison et al. |
| 6,922,276 | B2 | 7/2005 | Zhang et al. |
| 6,950,220 | B2 | 9/2005 | Abramson et al. |
| 6,958,848 | B2 | 10/2005 | Cao et al. |
| 6,967,640 | B2 | 11/2005 | Albert et al. |
| 6,980,196 | B1 | 12/2005 | Turner et al. |
| 6,982,178 | B2 | 1/2006 | LeCain et al. |
| 6,987,603 | B2 | 1/2006 | Paolini, Jr. et al. |
| 6,995,550 | B2 | 2/2006 | Jacobson et al. |
| 7,002,728 | B2 | 2/2006 | Pullen et al. |
| 7,012,600 | B2 | 3/2006 | Zehner et al. |
| 7,012,735 | B2 | 3/2006 | Honeyman et al. |
| 7,023,420 | B2 | 4/2006 | Comiskey et al. |
| 7,030,412 | B1 | 4/2006 | Drzaic et al. |
| 7,030,854 | B2 * | 4/2006 | Baucom et al. ............... 345/107 |
| 7,034,783 | B2 | 4/2006 | Gates et al. |
| 7,038,655 | B2 | 5/2006 | Herb et al. |
| 7,061,663 | B2 | 6/2006 | Cao et al. |
| 7,071,913 | B2 | 7/2006 | Albert et al. |
| 7,075,502 | B1 | 7/2006 | Drzaic et al. |
| 7,075,703 | B2 | 7/2006 | O'Neil et al. |
| 7,079,305 | B2 | 7/2006 | Paolini, Jr. et al. |
| 7,106,296 | B1 | 9/2006 | Jacobson |
| 7,109,968 | B2 | 9/2006 | Albert et al. |
| 7,110,163 | B2 | 9/2006 | Webber et al. |
| 7,110,164 | B2 | 9/2006 | Paolini, Jr. et al. |
| 7,116,318 | B2 | 10/2006 | Amundson et al. |
| 7,116,466 | B2 | 10/2006 | Whitesides et al. |

| | | | |
|---|---|---|---|
| 7,119,759 B2 | 10/2006 | Zehner et al. | |
| 7,119,772 B2 | 10/2006 | Amundson et al. | |
| 7,148,128 B2 | 12/2006 | Jacobson | |
| 7,167,155 B1 | 1/2007 | Albert et al. | |
| 7,170,670 B2 | 1/2007 | Webber | |
| 7,173,752 B2 | 2/2007 | Doshi et al. | |
| 7,176,880 B2 | 2/2007 | Amundson et al. | |
| 7,180,649 B2 | 2/2007 | Morrison et al. | |
| 7,190,008 B2 | 3/2007 | Amundson et al. | |
| 7,193,625 B2 | 3/2007 | Danner et al. | |
| 7,202,847 B2 | 4/2007 | Gates | |
| 7,202,991 B2 | 4/2007 | Zhang et al. | |
| 7,206,119 B2 | 4/2007 | Honeyman et al. | |
| 7,223,672 B2 | 5/2007 | Kazlas et al. | |
| 7,230,750 B2 | 6/2007 | Whitesides et al. | |
| 7,230,751 B2 | 6/2007 | Whitesides et al. | |
| 7,236,290 B1 | 6/2007 | Zhang et al. | |
| 7,236,291 B2 | 6/2007 | Kaga et al. | |
| 7,236,292 B2 | 6/2007 | LeCain et al. | |
| 7,242,513 B2 | 7/2007 | Albert et al. | |
| 7,247,379 B2 | 7/2007 | Pullen et al. | |
| 7,256,766 B2 | 8/2007 | Albert et al. | |
| 7,259,744 B2 | 8/2007 | Arango et al. | |
| 7,265,895 B2 | 9/2007 | Miyazaki et al. | |
| 7,280,094 B2 | 10/2007 | Albert | |
| 7,304,634 B2 | 12/2007 | Albert et al. | |
| 7,304,787 B2 | 12/2007 | Whitesides et al. | |
| 7,312,784 B2 | 12/2007 | Baucom et al. | |
| 7,312,794 B2 | 12/2007 | Zehner et al. | |
| 7,312,916 B2 | 12/2007 | Pullen et al. | |
| 7,321,459 B2 | 1/2008 | Masuda et al. | |
| 7,327,511 B2 | 2/2008 | Whitesides et al. | |
| 7,339,715 B2 | 3/2008 | Webber et al. | |
| 7,349,148 B2 | 3/2008 | Doshi et al. | |
| 7,352,353 B2 | 4/2008 | Albert et al. | |
| 7,365,394 B2 | 4/2008 | Denis et al. | |
| 7,365,733 B2 | 4/2008 | Duthaler et al. | |
| 7,375,875 B2 | 5/2008 | Whitesides et al. | |
| 7,382,363 B2 | 6/2008 | Albert et al. | |
| 7,388,572 B2 | 6/2008 | Duthaler et al. | |
| 7,391,555 B2 | 6/2008 | Albert et al. | |
| 7,411,719 B2 | 8/2008 | Paolini, Jr. et al. | |
| 7,411,720 B2 | 8/2008 | Honeyman et al. | |
| 7,420,549 B2 | 9/2008 | Jacobson et al. | |
| 7,436,577 B2 | 10/2008 | Moriyama et al. | |
| 7,442,587 B2 | 10/2008 | Amundson et al. | |
| 7,443,571 B2 | 10/2008 | LeCain et al. | |
| 7,453,445 B2 | 11/2008 | Amundson | |
| 7,492,339 B2 | 2/2009 | Amundson | |
| 7,492,497 B2 | 2/2009 | Paolini, Jr. et al. | |
| 7,513,813 B2 | 4/2009 | Paolini, Jr. et al. | |
| 7,528,822 B2 | 5/2009 | Amundson et al. | |
| 7,532,388 B2 | 5/2009 | Whitesides et al. | |
| 7,535,624 B2 | 5/2009 | Amundson et al. | |
| 7,545,358 B2 | 6/2009 | Gates et al. | |
| 7,551,346 B2 | 6/2009 | Fazel et al. | |
| 7,554,712 B2 | 6/2009 | Patry et al. | |
| 7,561,324 B2 | 7/2009 | Duthaler et al. | |
| 7,583,251 B2 | 9/2009 | Arango et al. | |
| 7,583,427 B2 | 9/2009 | Danner et al. | |
| 7,598,173 B2 | 10/2009 | Ritenour et al. | |
| 7,602,374 B2 | 10/2009 | Zehner et al. | |
| 7,605,799 B2 | 10/2009 | Amundson et al. | |
| 7,636,191 B2 | 12/2009 | Duthaler | |
| 7,649,666 B2 | 1/2010 | Isobe et al. | |
| 7,649,674 B2 | 1/2010 | Danner et al. | |
| 7,667,684 B2 | 2/2010 | Jacobson et al. | |
| 7,667,886 B2 | 2/2010 | Danner et al. | |
| 7,672,040 B2 | 3/2010 | Sohn et al. | |
| 7,679,599 B2 | 3/2010 | Kawai | |
| 7,679,814 B2 | 3/2010 | Paolini et al. | |
| 7,688,297 B2 | 3/2010 | Zehner et al. | |
| 7,688,497 B2 | 3/2010 | Danner et al. | |
| 7,705,824 B2 | 4/2010 | Baucom et al. | |
| 7,728,811 B2 | 6/2010 | Albert et al. | |
| 7,729,039 B2 | 6/2010 | LeCain et al. | |
| 7,733,311 B2 | 6/2010 | Amundson et al. | |
| 7,733,335 B2 | 6/2010 | Zehner et al. | |
| 7,733,554 B2 | 6/2010 | Danner et al. | |
| 7,746,544 B2 | 6/2010 | Comiskey et al. | |
| 7,785,988 B2 | 8/2010 | Amundson et al. | |
| 7,787,169 B2 | 8/2010 | Abramson et al. | |
| 7,791,782 B2 | 9/2010 | Paolini et al. | |
| 7,791,789 B2 | 9/2010 | Albert et al. | |
| 7,826,129 B2 | 11/2010 | Wu et al. | |
| 7,839,564 B2 | 11/2010 | Whitesides et al. | |
| 7,843,621 B2 | 11/2010 | Danner et al. | |
| 7,843,624 B2 | 11/2010 | Danner et al. | |
| 7,843,626 B2 | 11/2010 | Amundson et al. | |
| 7,848,006 B2 | 12/2010 | Wilcox et al. | |
| 7,848,007 B2 | 12/2010 | Paolini, Jr. et al. | |
| 7,859,637 B2 | 12/2010 | Amundson et al. | |
| 7,893,435 B2 | 2/2011 | Kazlas et al. | |
| 7,898,717 B2 | 3/2011 | Patry et al. | |
| 7,903,319 B2 | 3/2011 | Honeyman et al. | |
| 7,910,175 B2 | 3/2011 | Webber et al. | |
| 7,952,557 B2 | 5/2011 | Amundson et al. | |
| 7,952,790 B2 | 5/2011 | Honeyman et al. | |
| 7,956,841 B2 | 6/2011 | Albert et al. | |
| 7,957,053 B2 | 6/2011 | Honeyman et al. | |
| 7,986,450 B2 | 7/2011 | Cao et al. | |
| 7,999,787 B2 | 8/2011 | Amundson et al. | |
| 8,009,344 B2 | 8/2011 | Danner et al. | |
| 8,009,348 B2 | 8/2011 | Zehner et al. | |
| 8,018,640 B2 | 9/2011 | Whitesides et al. | |
| 8,027,081 B2 | 9/2011 | Danner et al. | |
| 8,034,209 B2 | 10/2011 | Danner et al. | |
| 8,035,611 B2 | 10/2011 | Sakamoto | |
| 8,035,886 B2 | 10/2011 | Jacobson | |
| 8,040,594 B2 | 10/2011 | Paolini, Jr. et al. | |
| 8,049,947 B2 | 11/2011 | Danner et al. | |
| 8,054,526 B2 | 11/2011 | Bouchard | |
| 8,064,962 B2 | 11/2011 | Wilcox et al. | |
| 8,068,272 B2 | 11/2011 | LeCain et al. | |
| 8,077,141 B2 | 12/2011 | Duthaler et al. | |
| 8,077,381 B2 | 12/2011 | LeCain et al. | |
| 8,089,453 B2 | 1/2012 | Comiskey et al. | |
| 8,098,418 B2 | 1/2012 | Paolini et al. | |
| 8,115,729 B2 | 2/2012 | Danner et al. | |
| 8,125,501 B2 | 2/2012 | Amundson et al. | |
| 8,129,655 B2 | 3/2012 | Jacobson et al. | |
| 8,139,050 B2 | 3/2012 | Jacobson et al. | |
| 8,169,400 B2 | 5/2012 | Shih | |
| 2001/0055000 A1 | 12/2001 | Kanae et al. | |
| 2002/0033792 A1 | 3/2002 | Inoue | |
| 2002/0060321 A1 | 5/2002 | Kazlas et al. | |
| 2002/0090980 A1 | 7/2002 | Wilcox et al. | |
| 2002/0171620 A1 | 11/2002 | Gordon, II et al. | |
| 2003/0020844 A1* | 1/2003 | Albert et al. | 349/33 |
| 2003/0102858 A1 | 6/2003 | Jacobson et al. | |
| 2003/0151702 A1* | 8/2003 | Morrison et al. | 349/25 |
| 2004/0105036 A1 | 6/2004 | Danner et al. | |
| 2004/0119681 A1* | 6/2004 | Albert et al. | 345/107 |
| 2004/0263947 A1 | 12/2004 | Drzaic et al. | |
| 2005/0012980 A1 | 1/2005 | Wilcox et al. | |
| 2005/0122284 A1 | 6/2005 | Gates et al. | |
| 2005/0122306 A1 | 6/2005 | Wilcox et al. | |
| 2005/0122563 A1 | 6/2005 | Honeyman et al. | |
| 2005/0156340 A1 | 7/2005 | Valianatos et al. | |
| 2005/0179642 A1 | 8/2005 | Wilcox et al. | |
| 2005/0253777 A1 | 11/2005 | Zehner et al. | |
| 2005/0259068 A1 | 11/2005 | Nihei et al. | |
| 2006/0007194 A1 | 1/2006 | Verschueren et al. | |
| 2006/0087479 A1 | 4/2006 | Sakurai et al. | |
| 2006/0087489 A1 | 4/2006 | Sakurai et al. | |
| 2006/0087718 A1 | 4/2006 | Takagi et al. | |
| 2006/0152474 A1 | 7/2006 | Saito et al. | |
| 2006/0181504 A1 | 8/2006 | Kawai | |
| 2006/0197737 A1 | 9/2006 | Baucom et al. | |
| 2006/0209008 A1 | 9/2006 | Nihei et al. | |
| 2006/0214906 A1 | 9/2006 | Kobayashi et al. | |
| 2006/0231401 A1 | 10/2006 | Sakurai et al. | |
| 2006/0238488 A1 | 10/2006 | Nihei et al. | |
| 2006/0263927 A1 | 11/2006 | Sakurai et al. | |
| 2007/0013683 A1 | 1/2007 | Zhou et al. | |
| 2007/0052757 A1 | 3/2007 | Jacobson | |
| 2007/0091417 A1 | 4/2007 | Cao et al. | |
| 2007/0091418 A1 | 4/2007 | Danner et al. | |

| | | | |
|---|---|---|---|
| 2007/0097489 | A1 | 5/2007 | Doshi et al. |
| 2007/0103427 | A1 | 5/2007 | Zhou et al. |
| 2007/0195399 | A1 | 8/2007 | Aylward et al. |
| 2007/0211002 | A1 | 9/2007 | Zehner et al. |
| 2007/0285385 | A1 | 12/2007 | Albert et al. |
| 2008/0024429 | A1 | 1/2008 | Zehner |
| 2008/0024482 | A1 | 1/2008 | Gates et al. |
| 2008/0043318 | A1 | 2/2008 | Whitesides et al. |
| 2008/0048969 | A1 | 2/2008 | Whitesides et al. |
| 2008/0048970 | A1 | 2/2008 | Drzaic et al. |
| 2008/0054879 | A1 | 3/2008 | LeCain et al. |
| 2008/0074730 | A1 | 3/2008 | Cao et al. |
| 2008/0129667 | A1 | 6/2008 | Zehner et al. |
| 2008/0130092 | A1 | 6/2008 | Whitesides et al. |
| 2008/0136774 | A1 | 6/2008 | Harris et al. |
| 2008/0150888 | A1 | 6/2008 | Albert et al. |
| 2008/0218839 | A1 | 9/2008 | Paolini, Jr. et al. |
| 2008/0266245 | A1 | 10/2008 | Wilcox et al. |
| 2008/0273132 | A1 | 11/2008 | Hsu et al. |
| 2008/0291129 | A1 | 11/2008 | Harris et al. |
| 2008/0309350 | A1 | 12/2008 | Danner et al. |
| 2009/0004442 | A1 | 1/2009 | Danner |
| 2009/0009852 | A1 | 1/2009 | Honeyman et al. |
| 2009/0034057 | A1 | 2/2009 | LeCain et al. |
| 2009/0046082 | A1 | 2/2009 | Jacobson et al. |
| 2009/0122389 | A1 | 5/2009 | Whitesides et al. |
| 2009/0174651 | A1 | 7/2009 | Jacobson et al. |
| 2009/0179923 | A1 | 7/2009 | Amundson et al. |
| 2009/0195568 | A1 | 8/2009 | Sjodin |
| 2009/0237773 | A1 | 9/2009 | Cao et al. |
| 2009/0256799 | A1 | 10/2009 | Ohkami et al. |
| 2009/0315044 | A1 | 12/2009 | Amundson et al. |
| 2009/0322721 | A1 | 12/2009 | Zehner et al. |
| 2010/0044894 | A1 | 2/2010 | Valianatos et al. |
| 2010/0045592 | A1 | 2/2010 | Arango et al. |

FOREIGN PATENT DOCUMENTS

| | | |
|---|---|---|
| EP | 1145072 B1 | 5/2003 |
| JP | 2000-132122 | 5/2000 |
| JP | 2001-125514 | 5/2001 |
| JP | 2002-162650 | 6/2002 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/099862 | 11/2004 |
| WO | WO 2011/146920 | 11/2011 |

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.
Amundson, K., et al., "Flexible, Active-Matrix Display Constructed Using a Microencapsulated Electrophoretic Material and an Organic-Semiconductor-Based Backplane", SID 01 Digest, 160 (Jun. 2001).
Au, J. et al., "Ultra-Thin 3.1-in. Active-Matrix Electronic Ink Display for Mobile Devices", IDW'02, 223 (2002).
Bach, U., et al., "Nanomaterials-Based Electrochromics for Paper-Quality Displays", Adv. Mater, 14(11), 845 (2002).
Bouchard, A. et al., "High-Resolution Microencapsulated Electrophoretic Display on Silicon", SID 04 Digest, 651 (2004).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Comiskey, B., et al., "An electrophoretic ink for all-printed reflective electronic displays", Nature, 394, 253 (1998).
Comiskey, B., et al., "Electrophoretic Ink: A Printable Display Material", SID 97 Digest (1997), p. 75.
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Gates, H. et al., "A5 Sized Electronic Paper Display for Document Viewing", SID 05 Digest, (2005).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Johnson, M. et al., "High Quality Images on Electronic Paper Displays", SID 05 Digest, 1666 (2005).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances, SID 01 Digest, 152 (Jun. 2001).
Kitamura, T., et al., "Electrical toner movement for electronic paper-like display", Asia Display/IDW '01, p. 1517, Paper HCS1-1 (2001).
O'Regan, B. et al., "A Low Cost, High-efficiency Solar Cell Based on Dye-sensitized colloidal TiO2 Films", Nature, vol. 353, Oct. 24, 1991, 773-740.
Pitt, M.G., et al., "Power Consumption of Microencapsulated Electrophoretic Displays for Smart Handheld Applications", SID 02 Digest, 1378 (2002).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, M., et al., "Equivalent Circuit of Ion Projection-Driven Electrophoretic Display," IEICE Transactions, 74, 4152 (1991).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

* cited by examiner

APPARATUS FOR DISPLAYING DRAWINGS

REFERENCE TO RELATED APPLICATIONS

This application is a divisional of application Ser. No. 11/306,315, filed Dec. 22, 2005 (Publication No. 2006/0197737, now U.S. Pat. No. 7,705,824), which is a divisional of application Ser. No. 10/063,023, filed Mar. 13, 2002 (Publication No. 2002/0130832, now U.S. Pat. No. 7,030,854 issued Apr. 18, 2006), which claims priority from Provisional Application Ser. No. 60/275,291, filed Mar. 13, 2001.

BACKGROUND OF INVENTION

The present invention relates apparatus for displaying drawings. More specifically, this invention relates to an apparatus for displaying drawings which makes use of a rewritable medium, preferably an electrophoretic medium.

The present invention also relates to displays incorporating touch screens.

The term drawings is used herein to cover, inter alia, construction drawings, blueprints, architectural drawings, maps, plans, and similar types of technical drawings which may be required, for example, for the assembly, repair and maintenance of machinery.

Electro-optic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range. The electro-optic material may be a particle-based electrophoretic material comprising at least one type of electrically charged particle capable of moving through a suspending fluid upon application of an electric field, and such an electrophoretic material may or may not be encapsulated; see, for example, U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; 6,312,304; 6,312,971; 6,323,989; and 6,327,072; U.S. Patent Application Publication No. 2001-0045934; and International Applications Publication Nos. WO 97/04398; WO 98/03896; WO 98/19208; WO 98/41898; WO 98/41899; WO 99/10767; WO 99/10768; WO 99/10769; WO 99/47970; WO 99/53371; WO 99/53373; WO 99/56171; WO 99/59101; WO 99/67678; WO 00/03349; WO 00/03291; WO 00/05704; WO 00/20921; WO 00/20922; WO 00/20923; WO 00/26761; WO 00/36465; WO 00/36560; WO 00/36666; WO 00/38000; WO 00/38001; WO 00/59625; WO 00/60410; WO 00/67110; WO 00/67327 WO 01/02899; WO 01/07691; WO 01/08241; WO 01/08242; WO 01/17029; WO 01/17040; WO 01/17041; WO 01/80287 and WO 02/07216. The entire disclosures of all these patents and published applications, all of which are in the name of, or assigned to, the Massachusetts Institute of Technology (MIT) or E Ink Corporation, are herein incorporated by reference. Alternatively, the electro-optic material may be of the rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). The electro-optic medium could also be an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737. Nanochromic films of this type are also described, for example, in International Applications Publication Nos. WO 98/35267 and WO 01/27690; the entire contents of these two applications are herein incorporated by reference. Other types of electro-optic materials, for example, liquid crystals, especially polymer-dispersed liquid crystals, may also be used in such displays.

Some electro-optic displays can have attributes of good brightness and contrast, wide viewing angles, state bistability, and low power consumption when compared with liquid crystal displays. (The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.)

An encapsulated, electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

It has now been realized that the properties of many electro-optic media, and especially the aforementioned encapsulated electrophoretic media, in particular their rewritable nature and their bistability, render such media especially adapted for solving certain problems associated with display of drawings under conditions often experienced in industry (including the construction industry). Accordingly, in one aspect this invention relates to apparatus useful for display of drawings and adapted to take advantage of the properties of such media.

Architects, builders and engineers employed in the construction industry working on large projects may require frequent access to hundreds, if not thousands, of drawings, and it is impracticable for them to carry a complete set of such drawings around with them. Although electronic storage of the necessary drawings would appear to be the solution, the display devices conventionally used with electronic storage are not well adapted for either the type of drawings involved or the environment in which they have to be used. Computer monitors based on cathode ray tubes are, of course, too large and heavy, and require too much power, to be useful to someone moving around a construction site. Liquid crystal displays of the type used in portable computers are sufficiently light in weight and have sufficiently low power consumption for such purposes, but are fragile and difficult to read in sunlight. Furthermore, the maximum size of such displays is limited to about 15 inches diagonal, whereas construction drawings need to be much larger (typically about 24 by 36 inches) in order to show to scale details of a large building or device, and it is difficult to work with such drawings without seeing the whole drawing at once. Finally, construction sites present severe environmental hazards to portable computers, which may be damaged by rain, mud, blowing dust or excessive heat or cold. Similar problems are encountered by others needing access to large numbers of complex drawings, for example aircraft maintenance technicians.

The aforementioned media can readily be produced in the form of large, lightweight, tough rewritable sheets well adapted for display of construction and similar drawings, and such sheets can be incorporated into several types of storage devices which are less susceptible to the environmental hazards of construction sites and similar locations that are conventional portable computers. It is to such storage devices that the present invention relates.

SUMMARY OF INVENTION

In one aspect, this invention provides a first apparatus for displaying a drawing. This first apparatus comprises a housing having an aperture therein, and a drawing sheet movable through the aperture between a closed position, in which substantially the whole of the drawing sheet lies within the housing, and an open position in which at least a portion of the drawing sheet lies outside the housing. At least a portion of the drawing sheet comprises an electro-optic medium having first and second display states differing in at least one optical property, the medium being changed from its first to its second display state by application of an electric field to the medium. The apparatus also comprises writing means for writing on the electro-optic medium as the drawing sheet is moved from its closed to its open position and thereby producing a drawing on the electro-optic medium. This first apparatus of the invention may hereinafter be referred to as a "tube apparatus", since certain preferred embodiments of this apparatus, such as that illustrated in FIG. 1 of the accompanying drawings, have an external form which resembles a conventional mailing tube. It should be noted, however, that the housing of this first apparatus need not be tubular.

In another aspect, this invention provides a second apparatus for displaying a drawing. This second apparatus comprises a display member having a viewing surface, and support means for supporting the display member above a horizontal floor with the viewing surface facing upwardly. The second apparatus further comprises an electro-optic medium having first and second display states differing in at least one optical property, the medium being changed from its first to its second display state by application of an electric field to the medium, this electro-optic medium being disposed on the display member so as to be visible to an observer viewing the viewing surface. The second apparatus also comprises a writing head arranged to write on the electro-optic medium, and drive means for moving the writing head relative to the electro-optic medium. This second apparatus of the invention may hereinafter be referred to as a "table apparatus", since certain preferred embodiments of this apparatus, such as that illustrated in FIG. 2 of the accompanying drawings, have an external form which resembles a table.

In another aspect, this invention provides a display comprising an optic medium having a viewing surface through which an observer can view the optic medium and on which the observer can press, the optic medium being changeable between first and second display states differing in at least one optical property on application of a stimulus thereto. The display further comprises a touch screen disposed on the opposed side of the optic medium from the viewing surface, the optic medium being deformable such that pressure applied to the viewing surface is transmitted to the touch screen.

Finally, this invention provides a process for writing on a protected layer of electro-optic material, this protected layer comprising a layer of electro-optic material and a protective envelope substantially completely surrounding the layer of electro-optic material, the envelope having an openable and recloseable flap which can be opened to permit access to the layer of electro-optic material. This process also uses a writing apparatus comprising at least two spaced retaining members and a writing head which can be moved between these spaced retaining members. The process comprises opening the flap of the envelope; inserting the spaced retaining members within the envelope, thereby creating a gap between the layer of electro-optic material and one internal surface of the envelope; moving the writing head between the spaced retaining members and thereby writing an image on the layer of electro-optic material; withdrawing the spaced retaining members from the envelope; and reclosing the flap of the envelope.

Figure 1:
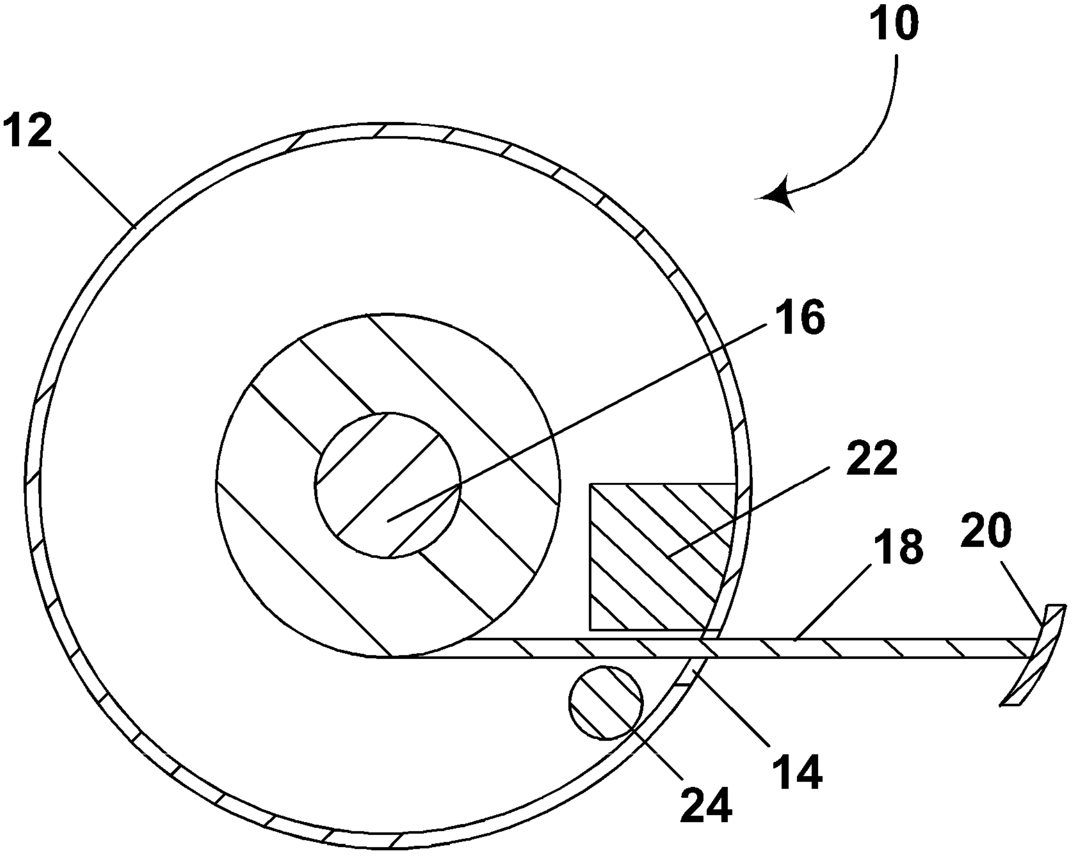
FIG. 1 of the accompanying drawings is a schematic section through a first tube apparatus of the present invention, the section being taken in a plane perpendicular to the axis of the tube apparatus.

The accompanying drawings are not strictly to scale, emphasis instead generally being placed upon illustrating the principles of the invention.

DETAILED DESCRIPTION

As already mentioned, in a first aspect this invention provides a "tube" apparatus for displaying a drawing, this apparatus comprising a housing having an aperture therein, and a drawing sheet movable through the aperture between an open and a closed position. An electro-optic medium having first and second display states differing in at least one optical characteristic is provided on the sheet, and the apparatus comprises writing means for writing on the electro-optic medium as the sheet is being moved from its closed to its open position.

This tube apparatus of the invention may have a rotatable spindle disposed within the housing, the drawing sheet, when in its closed position, being wound around the spindle, the drawing sheet being moved from its closed to its open position by being unwound from the spindle. In a preferred form of such a tube apparatus, the housing is substantially cylindrical, the spindle has an axis of rotation substantially parallel to the axis of the housing, and the aperture has the form of an elongate slot extending substantially parallel to the axis of the housing. The apparatus is conveniently provided with retraction means to retract the drawing sheet from its open to its closed position, and may also be provided with latching means having a latched position, in which the latching means prevent the retracting means retracting the drawing sheet from its open to its closed position, and an unlatched position, in which the latching means permits the retracting means to retract the drawing sheet from its open to its closed position. Conveniently, the writing means is mounted on the housing adjacent the aperture. The writing means may place upon the electro-optic medium an electrostatic charge which persists after the electro-optic medium has passed the writing means; this helps to retain the drawing on the electro-optic medium for the maximum time. The writing means may comprise a conductive member provided with biasing means arranged to bias the conductive member into contact with the drawing sheet as the writing means is writing on the drawing sheet, so that the conductive member forms one electrode of the writing means. Alternatively, at least the portion of the drawing sheet bearing the electro-optic medium may comprise a conductive layer to function as one electrode of the writing means.

In such a tube apparatus, a closure member may be secured to the drawing sheet in a position such that, when the drawing sheet is in its closed position, the closure member substantially closes the aperture, thus helping to prevent dust and dirt entering the housing when the drawing sheet is in its closed position. The apparatus may comprise data storage means for storing data representing a plurality of drawings, and data selection means for selecting at least one of this plurality of drawings for writing by the writing means on to the display sheet.

When the tube apparatus is to be used in dirty or dusty environments, as will often be the case on construction sites, it will often be advantageous to provide a protective sheet covering the electro-optic medium. Since it may be difficult or impossible to write on the medium with the protective layer in place, the protective layer may be separable from the electro-optic medium and the writing means may comprise separating means for separating the protective layer from the electro-optic medium before the electro-optic medium is written by the writing means, the separating means permitting the protective layer to overlie the electro-optic medium after the electro-optic medium has been written by the writing means.

To enable a user to consult multiple drawings at the same time, the tube apparatus may comprise at least two discrete drawing sheets, each of the drawings sheets having an associated writing means so that different drawings can be displayed on each discrete drawing sheet. Such an apparatus may have a rotatable spindle provided within its housing, all the drawing sheets, when in their closed positions, being wound around this spindle. Alternatively, the apparatus may have a plurality of rotatable spindles disposed within the housing, one spindle being associated with each drawing sheet, each drawing sheet, when in its closed position, being wound around its associated spindle.

In the table apparatus of the invention having a display member and means for supporting this member above a horizontal floor, the display member may have the form of a hollow box, the electro-optic medium being disposed on an internal surface of this box, and the portion of this box adjacent the electro-optic medium being substantially transparent so as to enable an observer to see the electro-optic medium through the viewing surface, and the writing head may comprise an elongate member arranged to move within the box so as to write on the electro-optic medium. Alternatively, in such box-like table apparatus, the writing head may comprise a stylus member and the drive means may be arranged to move the writing head in two dimensions over the electro-optic medium. In another embodiment of the table apparatus in which the display member has the form of a hollow box, the writing head may be disposed at a fixed location within the box, and the drive means may be arranged to drive the movable member past this fixed writing head.

Like the tube apparatus previously described, the table apparatus of the present invention may comprise data storage means for storing data representing a plurality of drawings, and data selection means for selecting at least one of this plurality of drawings for writing by the writing head on the electro-optic medium. The table apparatus may also comprise manually-operable data input means arranged so that data input to this data input means can modify a drawing displayed on the electro-optic medium. Data storage means may be operatively associated with the data input means and arranged to store modifications to drawings displayed on the apparatus and modified by data input to the data input means. The data input means may comprise one or more of a keyboard, a mouse, a joystick and a touch screen. In a preferred form of the table apparatus, the data input means comprises a touch screen disposed on the opposed side of the electro-optic medium from the viewing surface, the electro-optic medium being deformable such that pressure applied to the viewing surface is transmitted to the touch screen. In such an apparatus, the electro-optic medium is desirably substantially non-transmissive of visible light.

In both the tube and table apparatus of the present invention, the electro-optic medium may be of any of the types previously described, for example an electrochromic medium, a rotating bichromal member medium or an electrophoretic medium, especially an encapsulated electrophoretic medium.

As already mentioned, the present invention also provides a display comprising an optic medium having a viewing surface, and a touch screen disposed on the opposed side of the optic medium from the viewing surface. This type of display preferably uses an optic medium substantially non-transmissive of visible light. Either an air gap or a spacer layer may be provided between the optic medium and the touch screen. The optic medium may comprise a plurality of light emitting diodes or an electro-optic medium, for example, an electrochromic medium, a rotating bichromal member medium or an electrophoretic medium, especially an encapsulated electrophoretic medium.

As will readily be apparent to those skilled in the art of constructing displays, in such a display not only the optic medium itself but also electrodes and another other circuitry present adjacent the medium must withstand the deformation necessary to permit transmission of pressure from the viewing surface through the medium to the touch screen. Any of the known types of electrodes and associated circuitry may be used in the displays of the present invention. For example, the display may be of the "direct drive" type, in which one electrode is divided into a plurality of pixels and a discrete conductor and switching device are provided for each pixel; see for example the aforementioned WO 00/05704. Alternatively, the display may be of either the passive matrix or active matrix type, although it should be noted that certain types of optic media, because they lack a threshold, are not readily driven by a passive matrix technique. In an active matrix display a plurality of select lines and a plurality of data lines are provided, such that each pixel is defined uniquely by an intersection of a specific select line with a specific data line. Each pixel has a transistor, typically a thin film transistor, associated with it. One of the source and drain electrodes of the transistor is connected to a pixel electrode, which extends across the whole area of the pixel and applies an electric field to the optic medium (typically, in such an active matrix display, a single continuous electrode is used on the opposed side of the medium from the transistors). The other of the source and drain electrodes of the transistor is connected to a data line, while the gate of the transistor is connected to a select line (the data and select line connections could of course be reversed). See for example the aforementioned WO 00/67327. The use of organic semiconductors and/or organic conductive polymers may be useful in forming conductors and transistors with the necessary flexibility to withstand repeated deformations in the displays of the present invention.

In the process of the present invention, the layer of electro-optic material may be a discrete entity (i.e., a discrete sheet of electro-optic material), or the layer may be disposed on one internal surface of the envelope, though the latter is generally preferred since it prevents the electro-optic material slipping, and perhaps bending or folding during the writing process. The layer of electro-optic material and the envelope may be substantially rectangular, the spaced retaining members may comprise two parallel elongate members, and the spaced elongate members be inserted into the envelope so as to extend substantially along an opposed pair of edges thereof, so that substantially the whole of the layer of electro-optic material is available for writing by the writing head. Conveniently, the spacing between the spaced containing members can be varied, so that the spaced retaining members can be inserted within the envelope and the spacing between the spaced retaining members thereafter increased, thereby placing the envelope under tension before the writing head writes the image. The writing head may be arranged to commence writing the image at a portion of the electro-optic medium remote from the flap and to write successive portions of the image closer to the flap. As in the tube and table apparatus previously described, the electro-optic medium may be an electro-chromic medium, a rotating bichromal member medium or an electrophoretic medium, especially an encapsulated electrophoretic medium.

A first preferred tube apparatus of the present invention, this tube apparatus being designed to resemble the cylinders conventionally used to transport and protect construction drawings, is illustrated in schematic cross-section in FIG. 1 of the accompanying drawings. The apparatus (generally designated 10) comprises a substantially cylindrical housing 12, closed at both ends but with an elongate slot 14 running almost the full length of the housing 12 parallel to the axis thereof. A rotatable spindle 16 extends along the axis of the cylindrical housing 12, and a sheet 18 of electrophoretic medium is wound around the spindle 16. The sheet 18 is provided along one edge with a grip bar 20 which a user grips in order to pull the sheet 18 out of the housing 12, in the process unrolling the sheet 18 from around the spindle 16. The grip bar 20 is shaped so that when the sheet 18 is fully retracted within the housing 12, the grip bar 20 closes the slot 14, thus preventing dust or debris entering the housing 12. Thus, the sheet 18 can be moved manually between a closed position, in which most of the sheet 18 is wound around the spindle 16 and only a small part of the sheet 18 extends from the spindle 16 to the grip bar 20 adjacent the slot 14 (so that the whole of the sheet 18 lies within the housing 12), and an open position, in which the major part of the sheet 20 lies outside the housing 12; FIG. 1 illustrates the tube apparatus 10 as the sheet 18 is being moved from its closed to its open position.

As already indicated, the sheet 18 is intended to be pulled manually out of the housing 12. Obviously, it is necessary to provide a mechanism for refraction of the sheet 18 back into the housing 12, and this refraction mechanism may be of any convenient type. The retraction mechanism could be mechanical; for example, the spindle 16 could be provided with torsion springs which tighten as the sheet 18 is pulled from the housing 12, with a latching mechanism being provided to prevent premature retraction of the sheet 18 by the springs. Alternatively, the retraction mechanism could be power-operated; for example, a small electric motor could be provided to rotate the spindle 16 in order to retract the sheet 18. Obviously, if a power-operated retraction mechanism is provided, the same mechanism could also operate to drive the sheet 18 out of the housing 12.

Adjacent the slot 14 within the housing 12, there is provided a linear writing head 22 which writes an image on to the sheet 18 as the sheet is being pulled out of the housing 12. The writing head 22 may be of any of the types used for writing on electro-optic media, and thus may be, for example, in the form of a row of electrodes which contact the upper surface (in FIG. 1) of the sheet 18, or in the form of a row of wires or corotrons which place electrostatic charge on the upper surface of the sheet 18 without physically contacting the sheet, although in general the latter is preferred. Whether the writing head 22 is of a contact or non-contact type, it is desirable that the writing head 22 and the sheet 18 be selected so that they operate together in the so-called "electrostatic" mode, in which the writing head 22 places upon the adjacent surface of the sheet 18 an electrostatic charge which persists upon this surface for an extended period of time. Operating in this electrostatic mode enables the sheet 18 to be imaged more quickly (since each individual pixel of the image does not need to be in contact with the head 22 for the entire period necessary for the pixel to switch completely between its two optical states—each individual pixel can be in contact with the head 22 for a substantially shorter period, with the residual electrostatic charge left on the pixel sufficing to complete the switching process after the pixel has passed the head), and the persistence of the electrostatic charge on the medium increases the period for which the image remains stable.

A spring-biased roller 24 (a spring-biased bar could also be used) is provided adjacent the writing head 22 to bias the sheet 18 into proper contact with the writing head. At least the outer surface of the roller 24 is desirably electrically conductive so that the roller 24 can act as a counter electrode for the writing head 22. Alternatively, a conductive layer could be provided on the lower surface (in FIG. 1) of the sheet 18 to act as such a counter electrode; for example, the sheet 18 could be formed from an aluminized polyester film, a material which is readily available commercially. In order to allow for variations in the speed with which the sheet 18 is manually withdrawn from the housing 12, at least a portion of the roller 24 is desirably provided with markings which can be detected by a photodetector (not shown) as the roller 24 rotates as the sheet 18 is withdrawn, the signals from the photodetector being used, in a known manner, to control the operation of the writing head 22.

As will readily be apparent to those skilled in the technology of electrophoretic and similar displays, the apparatus 10 should be provided with control circuitry for controlling the operation of the writing head 22, a battery for powering the control circuitry and the writing head, a data storage device capable of storing multiple images, and a selection device (for example, a rotary switch, conveniently provided on one end of the cylindrical housing 12) for selecting which of the stored images is to the printed on the sheet 18. The apparatus 10 is also desirably provided with a connector for interfacing with an external data storage and/or display device. For example, the apparatus 10 could be provided with a USB port to enable it to communicate with a computer, thus allowing for downloading of images from a computer to the apparatus 10 and/or previewing on the computer of images stored in the apparatus 10. Alternatively or in addition, the apparatus 10 could be provided with a modem (desirably a wireless modem) to enable it to communicate with a central computer server on which a large number of images could be stored, thus enabling a user on site to receive any desired image from a company's collection.

The apparatus 10 can readily be constructed so that the sheet 18 can be replaced if it becomes excessively dirty or damaged in use. This is a substantial advantage, since electrophoretic media can be manufactured comparatively inexpensively, so that the sheet 18 could be replaced at a cost much lower than that of replacing the entire apparatus 10.

Figure 2:
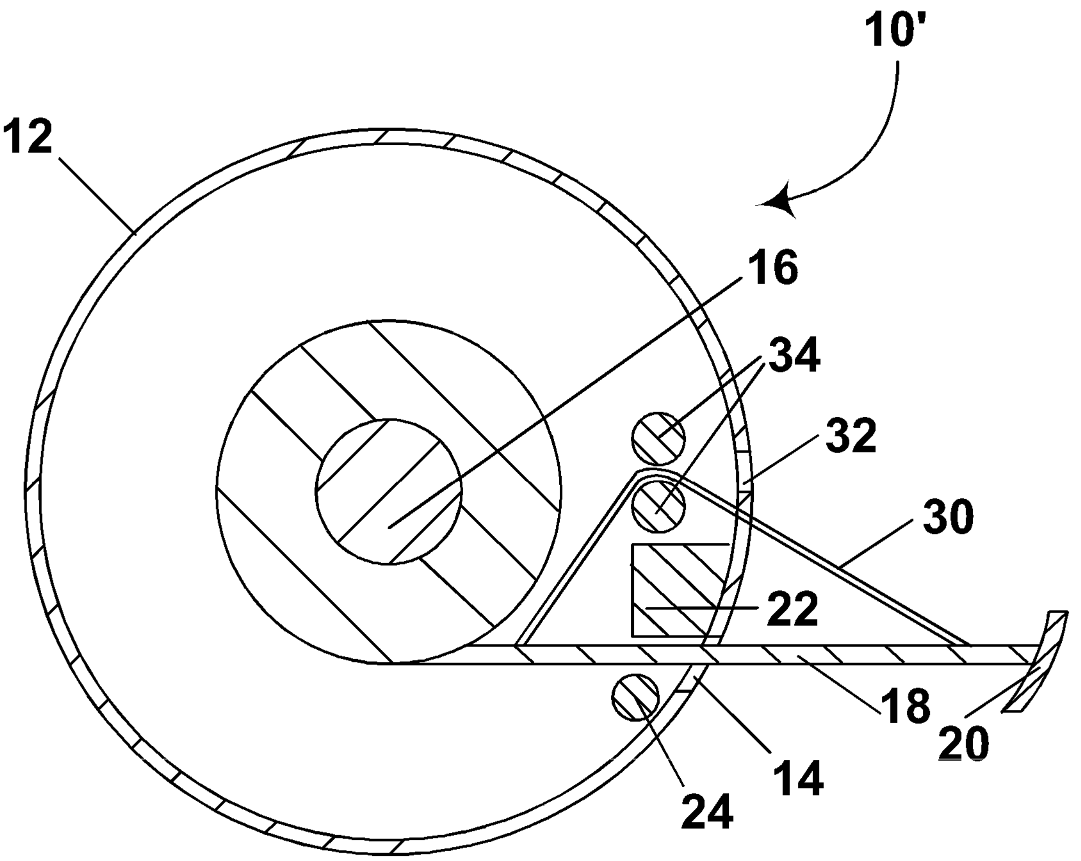
FIG. 2 is a schematic section, similar to that of FIG. 1, through a second tube apparatus of the present invention.

To reduce the need for replacement of the sheet of medium, the sheet may be provided with a protective cover, and a tube apparatus of this type (generally designated 10') is illustrated in FIG. 2. The apparatus shown in FIG. 2 closely resembles that shown in FIG. 1 but uses a transparent protective sheet 30 that overlies and protects the sheet 18. Like the sheet 18, the protective sheet 30 is wound around the spindle 16 and has one edge attached to the grip bar 20. However, since it may be difficult or impossible to write on the sheet 18 with the protective sheet 30 overlying the sheet 18, the protective sheet 30 does not pass through the slot 14, but instead passes through an auxiliary slot 32 which is parallel to, but spaced from, the slot 14. Rollers 34 are provided to guide the protective sheet 30 through the slot 32.

The use of the protective sheet 30 may also be advantageous in reducing the tendency for images, written on electro-optic media using the electrostatic mode described above, to smear when users rub or slide their hands across the images. Although the exact mechanism of this smearing is not at present well understood, it is related to the removal by the users of the residual electrostatic charge remaining on the medium. Placing a protective sheet 30 over the imaged medium avoids direct contact between the user and the medium, thus essentially preventing removal of the residual electrostatic charge and the resultant smearing.

The tube apparatus shown in FIGS. 1 and 2 write upon only a single sheet of medium at one time. In practice, users often need to refer to multiple construction drawings or blueprints at the same time, and given the size of the individual drawings or blueprints, this is normally done by stacking the drawings or blueprints on top of one another. The apparatus shown in FIGS. 1 and 2 can readily be modified to write on such a stack of sheets 18 by winding a plurality of such sheets around a single spindle but providing a separate printing head and associated roller for each sheet; in view of space constraints, in such an apparatus it may be convenient to provide the printing heads and associated rollers outside the cylindrical housing 12 and to protect these heads and rollers with an appropriate protective cover. Alternatively, the separate sheets 18 could be wound around individual parallel spindles within a single housing of larger diameter and/or non-circular cross-section; it will be appreciated that although the apparatus 10 and 10' is for convenience called a "tube apparatus" the housing 12 need not be cylindrical and could have any convenient form, for example a square or hexagonal prism, or a modified cylinder with one flat surface; such a modified cylinder might be used to reduce the tendency for a cylindrical housing to roll across a table on which it is placed.

Figure 3:
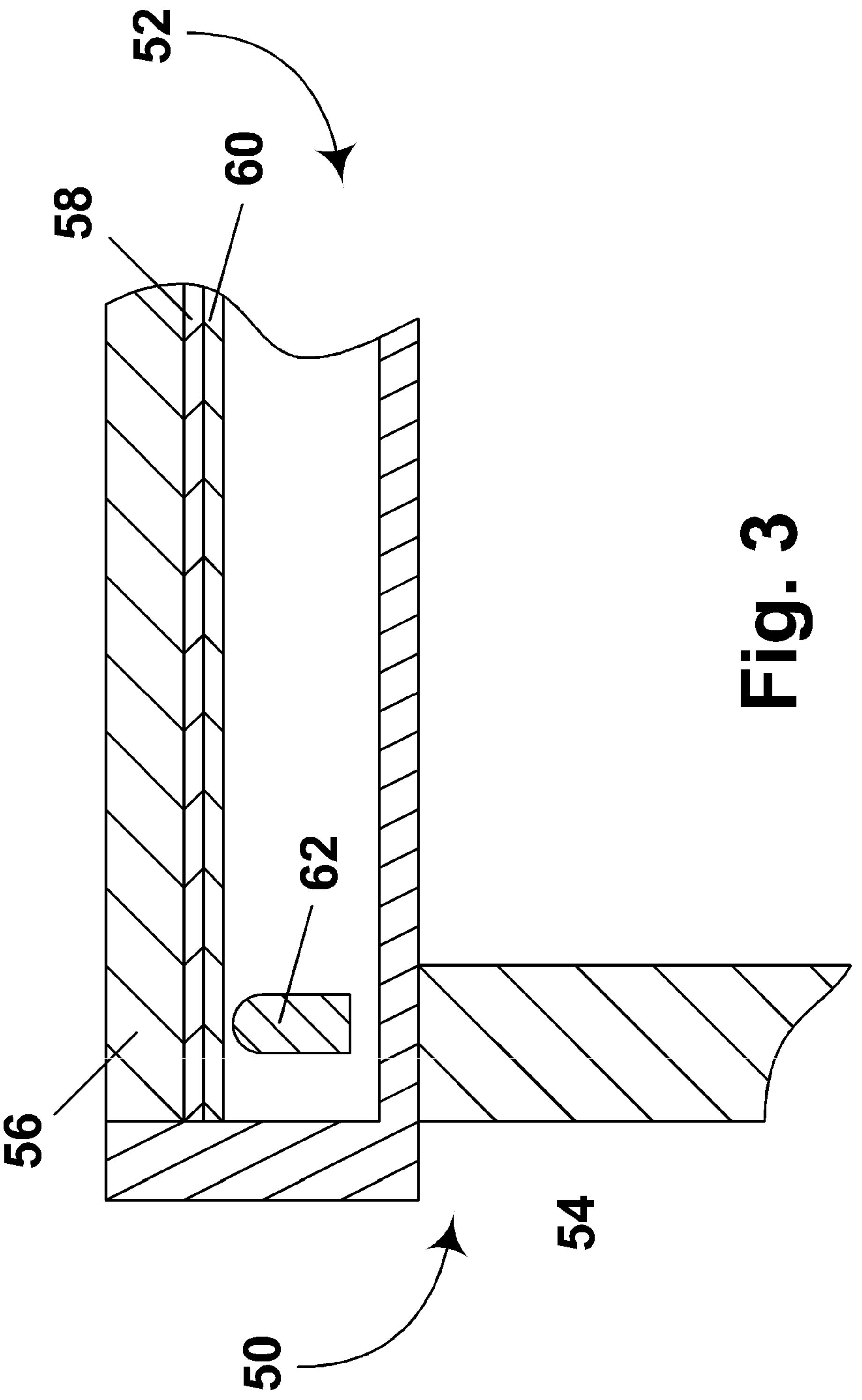
FIG. 3 is a schematic vertical section through a table apparatus of the present invention.

FIG. 3 illustrates in cross-section part of a preferred table apparatus of the present invention. The table apparatus (generally designated 50) shown in FIG. 3 is intended for use in a construction trailer or similar environment where it functions as a table, desk or similar article of furniture. The apparatus 50 comprises a horizontally disposed display member (module) or table top (generally designated 52) supported on legs 54, only one of which is visible in FIG. 3; these legs 54 preferably fold flat against the table top 52 for ease of transportation.

The table top 52 essentially has the form of a shallow closed box and comprises a transparent viewing member 56, which forms the upper face of the box and through which a user views the images provided by the apparatus 50. On the lower surface of the member 56 are coated a transparent electrode layer 58 and an electrophoretic medium layer 60 (other types of electro-optic medium could of course be used). A writing head 62, generally similar to the writing head 22 shown in FIG. 1, lies adjacent the exposed lower surface of the electrophoretic medium layer 60, and can be driven linearly in both directions relative to the layer 60 by a conventional drive mechanism (not shown). For example, the end portions of the writing head 62 could be provided with threaded apertures engaged with rotatable threaded drive rods in a manner well known to mechanical engineers.

The apparatus 50 may be provided with control circuitry for controlling the operation of the writing head 62, a battery for powering the control circuitry and the writing head, a data storage device capable of storing multiple images, and a selection device for selecting which of the stored images is to the printed on the layer 60, as described above with reference to FIG. 1. Also, the apparatus 50 is also desirably provided with a connector for interfacing with an external data storage and/or display device. Note, however, that the larger size of the apparatus shown in FIG. 3, as compared with those shown in FIGS. 1 and 2, renders it easier to incorporate conventional computer components into the apparatus of FIG. 3. For example, the apparatus shown in FIG. 3 could incorporate one or more conventional hard disks for storage of a large number of drawings. The apparatus could also be provided with data input means more elaborate than a simple selector for stored drawings. The data input means could comprise any one or more of a keyboard, a mouse, a joystick and a touch screen. A keypad or keyboard and/or a small preview screen might be provided to facilitate review of stored drawings; these components could conveniently be built into the viewing member 56. Finally, the apparatus of FIG. 3 could also be modified to incorporate a printer, preferably a thermal or ink jet printer, to provide hard copies of stored drawings when such copies are deemed essential.

Although the "table" type of apparatus shown in FIG. 3 does not permit stacking of drawings, it can readily be made large enough to display several sheets of construction drawings or blueprints at the same time.

The apparatus shown in FIG. 3 may be modified in several ways. For example, it is not essential that the electrophoretic medium layer 60 be coated on the underside of the viewing member 56. Instead, the electrophoretic medium layer could be provided on the surface of an endless loop or belt wrapped around two rollers disposed below the viewing member 56. A static writing head could be used to image the loop of electrophoretic medium; this writing head is preferably disposed inside the loop on the lower half of the loop so that the writing operation is not immediately visible to the user.

Alternatively, the electrophoretic medium layer coated on the viewing member 56 could be retained, and the writing head 62 replaced with a writing stylus, which could be driven in two dimensions in known manner. This type of apparatus might be especially useful for viewing images produced by computer-assisted design (CAD) software. Such software is often designed for use with pen plotters, and could readily be modified to control the operation of a stylus. (Some modification of software drivers used with pen plotters may be required, since such plotters normally write on the "front" surface of an output sheet, that is the surface intended to be viewed, whereas in the type of apparatus shown in FIG. 3, the stylus would write on the "rear" surface of the electrophoretic medium, thus requiring left-right reversal of the image written. However, the necessary modifications of driver software are well within the skill of programmers accustomed to writing such drivers.)

A touch screen extending over part or all of the upper surface of the viewing member 56, or the other types of data input means previously discussed, could also be used to allow for modification of drawings displayed on the table apparatus, and thus enable modification of drawings on site. As is well known to those engaged in the construction industry, in any project of substantial size there are inevitably numerous changes between the original plans and the final structure as built, and these numerous changes must be incorporated into the plans in order that the eventual owners of the building can be provided with accurate plans of the building as actually constructed. Tracking these numerous changes is often an administrative nightmare, and it is not unknown for changes to be lost between the construction site and the persons preparing the "as built" plans. An apparatus of the present invention as shown in FIG. 3 with appropriate data input means and drawing software could be used to enable direct manipulation of drawings on site and re-transmission of the amended drawings back to a central database. Such an apparatus could also be used by engineers discussing possible ways of modifying existing plans to take account of difficulties experienced on site.

Although in the apparatus shown in FIG. 3, because of the rigid nature of the viewing member 56 and the placement of the writing head 62 behind this viewing member (from the perspective of the user), a touch screen would normally be placed on the upper surface of the viewing member 56, and thus between the user and the electrophoretic medium layer 60, this is not essential. Various electro-optic media, for example microencapsulated electrophoretic and bichromal rotating member media can withstand considerable pressure without damage, so that it is practicable to place a touch screen behind the medium, i.e., with the medium between the user and the touch screen. Indeed, since both microencapsulated electrophoretic and bichromal rotating member media normally operate in a reflective mode, and any touch screen construction placed between such a medium and a user necessarily absorbs some light and thus reduces the apparent brightness of the medium, it is generally preferred to place the touch screen behind the medium where the construction of the overall apparatus permits this. For example, if it is desired to incorporate a touch screen into the apparatus of the invention shown in FIG. 1 or 2, such a touch screen would preferably the placed on the back face of the sheet 18 (i.e., on the lower face as seen in FIG. 1 or 2).

Alternatively or in addition, the upper surface of the viewing member 56 shown in FIG. 3 could be treated to render it suitable for writing with an erasable marker or similar writing instrument capable of writing erasable markings Again, the provision of such a writing surface, which would enable users to superimpose temporary markings over a drawing, could be used by engineers discussing possible ways of modifying existing drawings or plans.

The usefulness of placing a touch screen "behind" an optic medium (i.e., on the opposed side of the medium from the observer/user of the display) is not, however, confined to a table apparatus and, as already mentioned, this invention provides a display comprising an optic medium having a viewing surface through which an observer can view the optic medium and on which the observer can press, this optic medium being changeable between first and second display states differing in at least one optical property on application of a stimulus thereto, the display further comprising a touch screen disposed on the opposed side of the optic medium from the viewing surface, the optic medium being deformable such that pressure applied to the viewing surface is transmitted to the touch screen. Most conventional displays using touch screens superposed on the display employ liquid crystals as the display medium. In such displays, it is in practice necessary to place the touch screen in front of the liquid crystal display medium, since liquid crystal displays typically need rigid glass supports which would not transmit finger pressure on the exposed surface of the display through the liquid crystal medium to a touch screen placed behind the liquid crystal medium. Furthermore, since conventional liquid crystal displays are viewed in transmission, light from a back lighting source placed behind the display medium and the touch screen will be subject to the same absorption regardless of which way round the display medium and the touch screen are placed, i.e., the light necessarily passes through both the display medium and the touch screen. Obviously, when a cathode ray tube is used as the display medium, the touch screen must be place in front of the cathode ray tube. Accordingly, it is conventional practice to place touch screens in front of their associated display media.

However, conventional touch screens are only about 68 percent transmissive, so employing a touch screen substantially diminishes the brightness of the display, and, at least partly for this reason, users frequently have difficulty using such displays (for example, automatic teller machines) in outdoor locations in bright daylight.

As already mentioned, various types of display media, such as encapsulated electrophoretic media and rotating bichromal member media, are capable of sustaining considerable pressure without damage, and such media can also be made sufficiently deformable to transmit pressure therethrough. With such media, the touch screen can be placed behind the display medium and still receive pressure applied by a user to the exposed face of the medium. Furthermore, most such media are substantially opaque (non-transmissive of visible light), and with such media a substantial increase in brightness of the display is achieved by placing the touch screen behind the display medium; the medium has the same brightness that it would if no touch screen were present, since the touch screen is invisible behind the opaque display medium, and the loss of brightness which would result from the double passage of the reflected light through a touch screen placed in front of the display medium is avoided. Also, the pressure applied to the display will, in most cases, not produce any change in the appearance of the display.

The touch screens used in the present displays may be of any conventional type. As is well-known to those skilled in the relevant art, the touch sensing means of a touch screen typically comprises two continuous orthogonal electrodes on two separate transparent substrates, these continuous electrodes acting as an analog voltage divider. Alternatively, such a touch sensing means may comprise two arrays of transparent electrodes on separate transparent substrates, for example, a series of parallel row electrodes on one substrate and a series of parallel column electrodes on the other, or a matrix array of electrodes on one substrate and a single continuous electrode on the other. In all cases, the two electrodes or arrays of electrodes lie parallel to one another but are spaced a short distance apart by mechanical spacers, a liquid film or pressurized gas. At least the front substrate (that adjacent the user) is made flexible so that application of modest pressure, as from a user's finger on the front substrate, will cause contact between the electrodes (or between at least one electrode in each array), thus enabling associated electronics to generate a signal indicating where on the sensing means the pressure was applied.

Although a touch screen itself typically requires two electrodes and an electro-optic display also requires two electrodes, in some cases (depending upon the type of touch screen used) it may be possible to reduce the complexity and expense of a touch screen with an electro-optic display by using only three electrodes. If one electrode of the touch screen is fabricated upon, a very thin substrate, it may be possible to use this electrode as both the front electrode of the touch screen and the rear electrode of the display; such a dual-function electrode may conveniently be of the continuous electrode type (i.e., in the form of a single electrode extending across the entire area of the touch screen display). Alternatively a single substrate, preferably a flexible plastic film, could be coated on both sides with a continuous layer of conductive material so that this coated substrate serves as both the front electrode of the touch screen and the rear electrode of the display.

In the present displays, an air gap may be provided between the display medium and the touch screen; the provision of such an air gap may be useful in preventing spurious outputs from the touch screen, for example, inputs caused by wind pressure on a display installed in an outdoor location. Alternatively, a spacer layer may be provided between the medium and the touch screen, this spacer layer transmitting pressure from the medium to the touch screen when pressure is applied to the medium.

Figure 4:
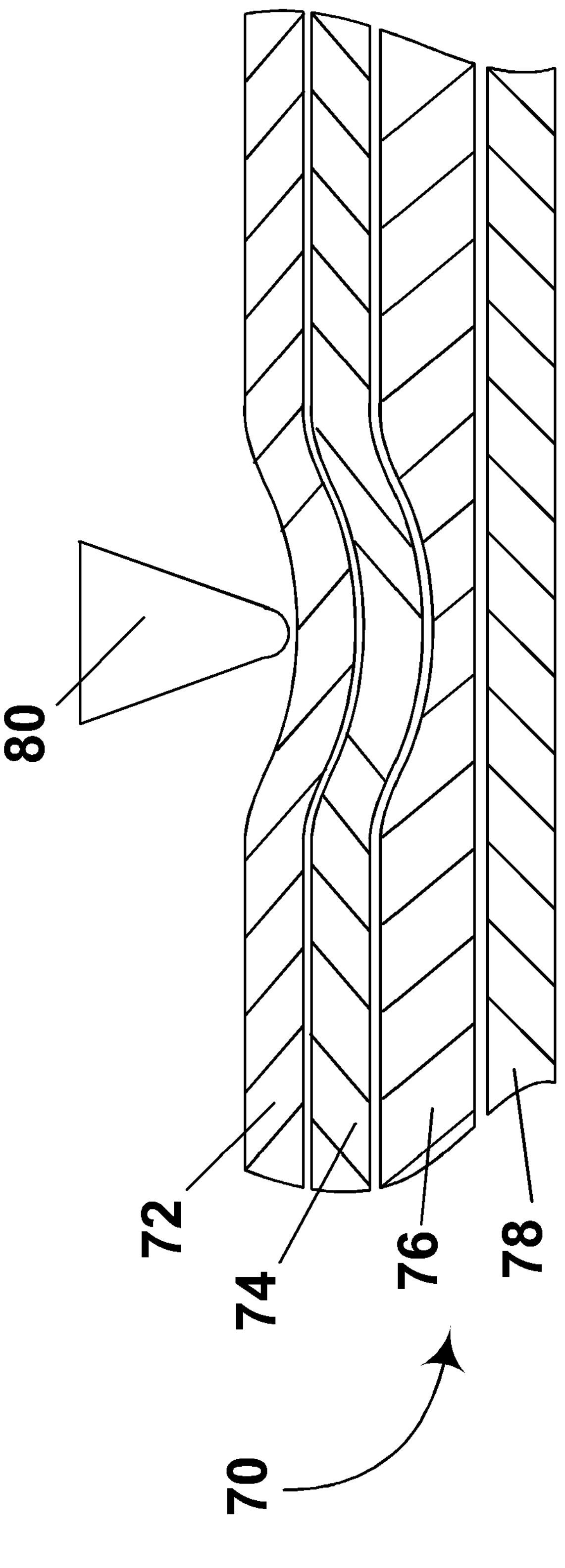
FIG. 4 is a schematic section through an apparatus of the present invention having a touch screen on the opposed side of an optic medium from a viewing surface.

FIG. 4 of the accompanying drawings is a schematic section through a display (generally designated 70) of the present invention. This display 70 comprises a protective layer 72, conveniently formed from a plastic film, the exposed surface of this protective layer 72 forming a viewing surface accessible to a user. The display 70 further comprises an encapsulated electrophoretic display medium 74 (the electrodes of both the display medium 74 and the touch screen described below are omitted from FIG. 4 for ease of illustration) in contact with the protective layer 72 and a touch screen 76 on the opposed side of the medium 74 from the viewing surface. Finally, the display 70 comprises a rigid casing 78.

As illustrated in FIG. 4, when pressure is applied to the protective layer 72 by a stylus 80 (finger pressure could alternatively be used) both the protective layer 72 and the display medium 74 deform, so that the touch screen 76 is compressed between the display medium 74 and the rigid casing 78 at the point where pressure is applied and a signal indicating the position where the pressure is applied is generated.

Figure 5:
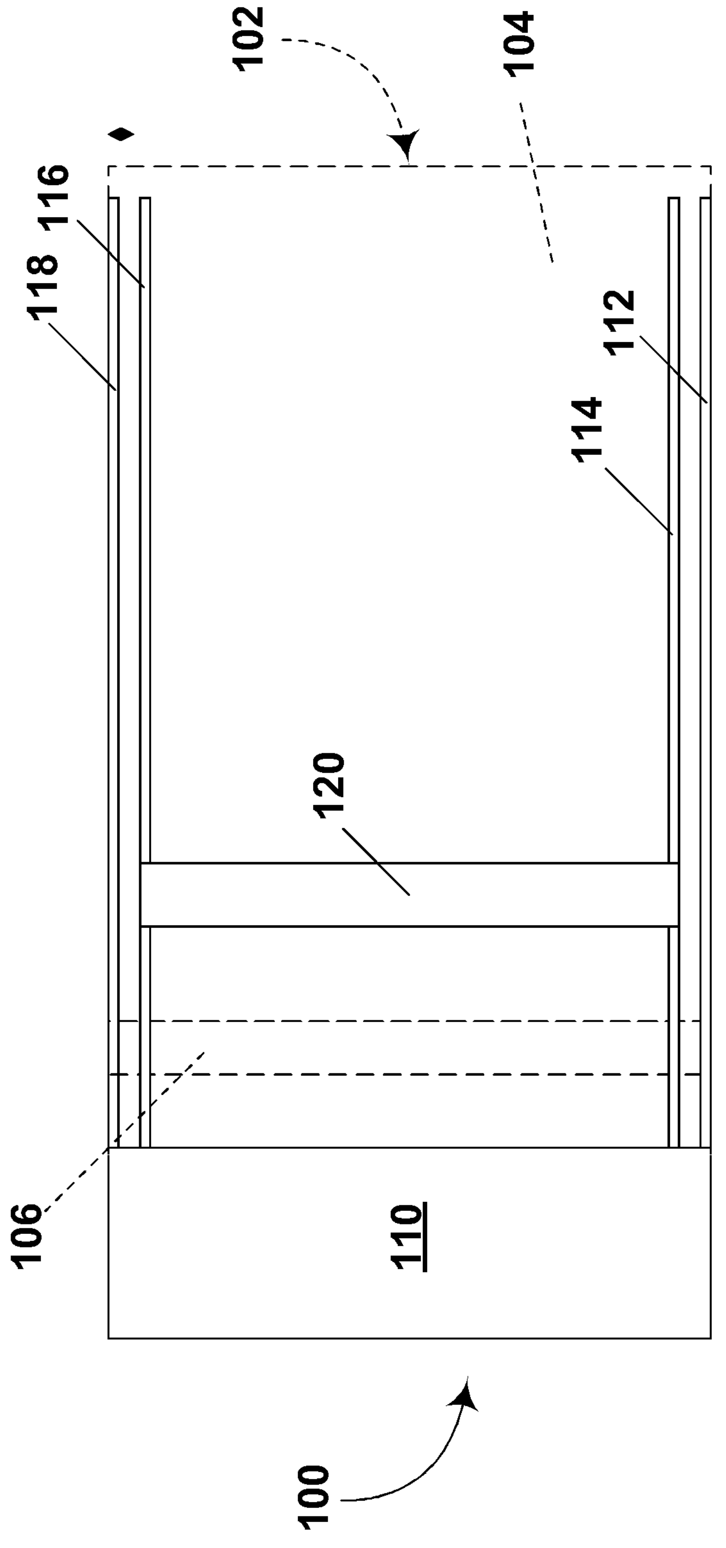
FIG. 5 is a schematic top plan view of a writing apparatus carrying out the process of the present invention.

FIG. 5 illustrates an apparatus (generally designated 100) for carrying out the method of the present invention and imaging a medium which can be handled as a loose sheet but which avoids exposing the imageable layer directly to the environment. The apparatus 100 images a medium (generally designated 102; the medium is shown in broken lines in FIG. 5 to illustrate more clearly the apparatus 100) having essentially the form of a re-sealable envelope and comprising two rectangular sheets (preferably formed of a polymeric film or similar tough material) sealed to each other along three of their edges, one of the sheets 104 bearing along its fourth edge a flap 106 provided with a re-sealable pressure sensitive adhesive, so that this flap 106 can be removed from, and replaced back on, one surface of the other sheet in the same manner as in a conventional envelope. The sheet 104 is transparent and bears on its inner surface an imageable layer (not shown).

The apparatus 100 comprises a control unit 110 from which extend two pairs of parallel rods 112, 114, 116 and 118. The outer pair of rods 112 and 118 support the medium 102 during printing; as shown in FIG. 5, the user opens the flap 106 and slides the open end of the medium 102 over the rods 112 and 118. As indicated by the double-headed arrow in FIG. 5, the rod 118 can be moved laterally by the user so that the medium 102 can easily be slid over the rods 112 and 118, but so that once the rod 118 has been moved back to its outer position the rods 112 and 118 hold the sheets under tension, so that the sheet 104 will remain flat during the printing operation described below. A manually-operable latching mechanism (not shown) is provided to enable the rod 118 to be locked in its outer position.

The inner pair of rods 114 and 116 carry a writing head 120 which can be moved linearly in both directions along the rods 114 and 116. As the writing head 120 traverses the rods 114 and 116, it writes an image on the imageable layer on the inner surface of the sheet 104 under the control of circuitry (not shown) provided within the control unit 110.

Once the medium 102 has been manually placed upon and tensioned by the rods 112 and 118 as previously described, the user presses a switch (not shown) on the control unit 110 to indicate that the medium 102 is ready for imaging. The control unit 110 then causes the writing head 120 to traverse the rods 114 and 116 and to write an image on the imageable layer. To avoid any possibility of damage to the apparatus 100 by an impetuous user, it is preferred that the writing head 120 first move rapidly to its outer position (remote from the control unit 110) and write the image as it moves back towards the control unit; thus, if the user attempts to remove the medium 102 from the rods 112 and 118 before the writing head 120 has completely returned to its inner position, there is little risk of damage to the writing head since the writing head will already be essentially clear of the medium 102. Once the writing operation is complete, the user moves the rod 118 inwardly, removes the medium 102 from the apparatus 100 and re-seals the flap 106 against the other sheet, so keeping the imageable layer within a sealed envelope during use of the imaged medium 102.

As will readily be apparent to those skilled in the imaging art, numerous changes and modifications can be made in the preferred embodiments of the present invention already described without departing from the spirit and skill of the invention. For example, the apparatus of the invention shown in FIGS. 1 and 2 could make use of the touch screen and writable surface described above with reference to FIG. 3; in the case of the apparatus shown in FIG. 2, the touch screen and/or writable surface could be provided on the protective sheet 30. In FIG. 4, the electrophoretic medium 74 could be replaced by a plurality of light emitting diodes, or an electrochromic or rotating bichromal member medium. In general, the preferred type of electro-optic medium for use in the apparatus, displays and process of the present invention is an encapsulated electrophoretic medium, and the reader is referred to the aforementioned MIT and E Ink patents and applications for further details of the preferred forms of this type of medium. Accordingly, the foregoing description is to be construed in an illustrative and not in a limitative sense.

The invention claimed is:

1. An active matrix display comprising an optic medium having a viewing surface through which an observer can view said optic medium and on which said observer can press, said optic medium being changeable between first and second display states differing in at least one optical property on application of a stimulus thereto, said display further comprising a plurality of select lines and a plurality of data lines are provided, such that each pixel is defined uniquely by an intersection of a specific select line with a specific data line, each pixel having a transistor associated therewith, one of the source and drain electrodes of the transistor being connected to a pixel electrode arranged to apply an electric field to the optic medium, and the other of the source and drain electrodes being connected to a data line, while the gate of the transistor is connected to a select line, said display further comprising a touch screen disposed on the opposed side of said optic medium from said viewing surface, said optic medium being deformable such that pressure applied to said viewing surface is transmitted to said touch screen.

2. An active matrix display according to claim 1 wherein the transistors of the display are formed from an organic semiconductor.

3. A display according to claim 1 wherein said optic medium is substantially non-transmissive of visible light.

4. A display according to claim 1 having an air gap between said optic medium and said touch screen, said optic medium deforming when pressure is applied thereto to close said air gap and thereby transmit pressure to said touch screen.

5. A display according to claim 1 having a spacer layer between said optic medium and said touch screen, said spacer layer transmitting pressure from said optic medium to said touch screen when pressure is applied to said optic medium.

6. A display according to claim 1 wherein said optic medium comprises a plurality of light emitting diodes.

7. A display according to claim 1 wherein said optic medium comprises an electro-optic medium capable of being changed between its first and second optic states by application of an electric field thereto.

8. A display according to claim 7 wherein said electro-optic medium comprises an electrochromic medium.

9. A display according to claim 7 wherein said electro-optic medium comprises a rotating bichromal member medium.

10. A display according to claim 7 wherein said electro-optic medium comprises an electrophoretic medium.

11. A display according to claim 10 wherein said electrophoretic medium is an encapsulated electrophoretic medium.

12. A display comprising an optic medium having a viewing surface through which an observer can view said optic medium and on which said observer can press, said optic medium being changeable between first and second display states differing in at least one optical property on application of a stimulus thereto, said display further comprising a touch screen disposed on the opposed side of said optic medium from said viewing surface, said optic medium being deformable such that pressure applied to said viewing surface is transmitted to said touch screen, said display further comprising an electrode disposed between the optic medium and the touch screen, said electrode serving as one of the electrodes of the display and one of the electrodes of the touch screen.

13. A display according to claim 12 wherein said optic medium is substantially non-transmissive of visible light.

14. A display according to claim 12 wherein said optic medium comprises a plurality of light emitting diodes.

15. A display according to claim 12 wherein said optic medium comprises an electro-optic medium capable of being changed between its first and second optic states by application of an electric field thereto.

16. A display according to claim 15 wherein said electro-optic medium comprises an electrochromic medium.

17. A display according to claim 15 wherein said electro-optic medium comprises a rotating bichromal member medium.

18. A display according to claim 15 wherein said electro-optic medium comprises an electrophoretic medium.

19. A display according to claim 18 wherein said electrophoretic medium is an encapsulated electrophoretic medium.

20. A display comprising an optic medium having a viewing surface through which an observer can view said optic medium and on which said observer can press, said optic medium being changeable between first and second display states differing in at least one optical property on application of a stimulus thereto, said display further comprising a touch screen disposed on the opposed side of said optic medium from said viewing surface, said optic medium being deformable such that pressure applied to said viewing surface is transmitted to said touch screen, said display further comprising a substrate disposed between the optic medium and the touch screen, the substrate being coated on both sides with a continuous layer of conductive material such that this coated substrate serves as one electrode of the display and one electrode of the touch screen.

21. A process for writing on a protected layer of electro-optic material, said protected layer comprising a layer of electro-optic material and a protective envelope substantially completely surrounding said layer of electro-optic material, said envelope having an openable and recloseable flap which can be opened to permit access to said layer of electro-optic material, said process using a writing apparatus comprising at least two spaced retaining members and a writing head which can be moved between said spaced retaining members, said process comprising:

opening said flap of said envelope;

inserting said spaced retaining members within said envelope, thereby creating a gap between said layer of electro-optic material and one internal surface of said envelope;

moving said writing head between said spaced retaining members and thereby writing an image on said layer of electro-optic material;

withdrawing said spaced retaining members from said envelope; and reclosing said flap of said envelope.

22. An apparatus for displaying a drawing, said apparatus comprising:

a housing having an aperture therein;

a drawing sheet movable through said aperture between a closed position, in which substantially the whole of said drawing sheet lies within said housing, and an open position, in which at least a portion of said drawing sheet lies outside said housing, at least a portion of said drawing sheet comprising an electro-optic medium having first and second display states differing in at least one optical property, said medium being changed from its first to its second display state by application of an electric field to said medium; and writing means for writing on said electro-optic medium as said drawing sheet is moved from its closed to its open position and thereby producing a drawing on said electro-optic medium.

23. An apparatus according to claim 22 wherein said drawing sheet comprises a protective layer covering said electro-optic medium, said protective layer being separable from said electro-optic medium, and wherein said writing means comprises separating means for separating said protective layer from said electro-optic medium before said electro-optic medium is written by said writing means, said separating means permitting said protective layer to overlie said electro-optic medium after said electro-optic medium has been written by said writing means.

* * * * *